UNITED STATES PATENT OFFICE.

A. LOVIS, OF BOSTON, MASSACHUSETTS, ASSIGNOR TO HIMSELF AND C. E. HODGES, OF SAME PLACE.

IMPROVEMENT IN COMPOSITIONS FOR DETERGENT PURPOSES.

Specification forming part of Letters Patent No. 26,072, dated November 8, 1859.

*To all whom it may concern:*

Be it known that I, AMBROSE LOVIS, of Boston, in the county of Suffolk and State of Massachusetts, have invented a new and useful Washing, Bleaching, and Disinfecting Liquid; and I hereby declare the following to be a clear, full, and exact description of the same.

It is well known that the soda which forms the basis of the washing-liquids now most generally employed tends not only to discolor and yellow the goods, but also to destroy their texture and cause them rapidly to wear out.

My present invention has for its object not only the cleansing of the goods, but also to disinfect and to whiten or bleach them, and to effect this double end without wearing out the fabric or otherwise injuring its texture.

My invention consists in the employment of a solution of silicate of soda, or of silicate of potash impregnated with chlorine, the silicate cleansing the fabric without injury to its texture, while the chlorine disinfects and whitens it.

To enable others skilled in the art to manufacture and use my washing-liquid, I will proceed to describe its nature and the manner in which it is employed.

In the manufacture of this washing and disinfecting liquid I employ the silicate of soda or potash, (for the manufacture of which Letters Patent of the United States were granted to Robert Prince and Ambrose Lovis on the 11th day of December, 1855,) or pure silicate of soda or silicate of potash; or a mixture of the two, however otherwise obtained, may be employed. The silicate is dissolved in boiling water until of the specific gravity of 1.1968 or 25° Baumé's hydrometer. To this solution chlorine is added in the proportion of three and one-half to five per cent. of the weight of the dry silicate contained in it by passing in chlorine gas or adding a solution of chlorine in caustic or carbonate of soda. When the latter process is employed one hundred pounds of chlorinated lime (the bleaching-powder of commerce) containing about thirty per cent. of chlorine is dissolved in water, and to the clear liquor is added a clear solution of one hundred and sixty pounds of carbonate of soda in water. The clear liquid is then decanted from the precipitated carbonate of lime and mixed with a solution of from six hundred to eight hundred and sixty pounds of silicate of soda or potash in sufficient water to give a specific gravity of 25° Baumé's hydrometer. These proportions I find most convenient and serviceable; but it is not necessary to adhere rigidly thereto. The article thus produced is not only a superior washing-liquid, but it possesses, in addition, both bleaching and disinfecting properties, the chlorine tending constantly to whiten the fabric, to remove mildew and other stains, and at the same time to thoroughly disinfect the clothes, the latter property rendering it peculiarly valuable in hospitals or during the prevalence of any infectious or contagious malady. When employed for the purpose of washing clothes or other cotton or linen fabrics about a gill of the liquid is mixed with fifteen gallons of water, and in this the goods are allowed to soak about the period of twelve hours. They are then taken out of this mixture and finished in clean water, either with or without soap, or in a further portion of water containing the silicate and chlorine mixture.

The above are the proportions which I have found most serviceable for ordinary use; but I do not confine myself thereto, as they may be varied to a considerable extent without materially affecting the result.

It has been found that the liquid above described softens hard water by the action of the alkaline silicate, renders the cotton and linen fabric more dense and consequently stronger, removes acid impregnations, and reduces the expenditure of soap and labor, thereby effecting a considerable saving in expense and in the wear of the goods, while the chlorine removes mildew, stains, and odors, renders the goods beautifully white, and effectually destroys all infection.

What I claim as my invention, and desire to secure by Letters Patent, is—

The above-described cleansing, bleaching, and disinfecting liquid, consisting of an alkaline silicate combined with chlorine, for the purpose specified.

AMBROSE LOVIS.

Witnesses:
SAM. COOPER,
THOS. L. GLOVER.